(12) United States Patent
Tuthill et al.

(10) Patent No.: US 7,111,854 B1
(45) Date of Patent: Sep. 26, 2006

(54) TRAILER SUB-FRAME ASSEMBLY

(75) Inventors: James C. Tuthill, Elkhart, IN (US); John C. Poague, Elkhart, IN (US)

(73) Assignee: Dexter Axle, Elkhart, IN (US)

( * ) Notice: Subject to any disclaimer, the term of this patent is extended or adjusted under 35 U.S.C. 154(b) by 12 days.

(21) Appl. No.: 10/461,927

(22) Filed: Jun. 13, 2003

Related U.S. Application Data (60) Provisional application No. 60/474,649, filed on May 30, 2003.

(51) Int. Cl.
*B62D 17/00* (2006.01)

(52) U.S. Cl. .................................. 280/86.75; 280/789

(58) Field of Classification Search ............ 280/86.75, 280/86.751, 86.753, 86.754, 86.757, 86.758, 280/124.109, 789
See application file for complete search history.

(56) References Cited

U.S. PATENT DOCUMENTS

| | | | |
|---|---|---|---|
| 1,497,069 A * | 6/1924 | Cooper ....................... 280/795 |
| 2,002,377 A | 5/1935 | Mayne | |
| 2,065,071 A | 12/1936 | Harris | |
| 2,109,311 A | 2/1938 | Dayton | |
| 2,162,828 A | 6/1939 | Slack | |
| 2,300,169 A | 10/1942 | Perkins | |
| 2,640,706 A | 6/1953 | Kuster | |
| 2,846,250 A | 8/1958 | Davis | |
| 3,082,017 A | 3/1963 | Moore | |
| 3,163,441 A | 12/1964 | Traugott | |
| 3,179,439 A | 4/1965 | Janeway | |
| 3,229,959 A | 1/1966 | Smothers | |
| 3,356,386 A | 12/1967 | Taylor | |
| 3,387,853 A * | 6/1968 | Sueoka ....................... 296/168 |
| 3,481,623 A | 12/1969 | Campbell | |
| 3,622,178 A * | 11/1971 | Tantlinger et al. ........ 280/766.1 |
| 3,666,288 A * | 5/1972 | Carton et al. ............... 280/683 |
| 3,787,073 A * | 1/1974 | Lievore ....................... 280/789 |
| 3,794,343 A | 2/1974 | Hickman | |
| 3,880,444 A * | 4/1975 | Bridges ................. 280/86.753 |
| 4,030,737 A * | 6/1977 | Bridges ................... 280/86.75 |
| 4,188,047 A | 2/1980 | Crean et al. | |
| 4,202,564 A | 5/1980 | Strader | |
| RE30,308 E | 6/1980 | Masser | |
| 4,267,896 A * | 5/1981 | Hendriksen .............. 280/86.75 |
| 4,453,735 A | 6/1984 | Penverne et al. | |
| 4,493,493 A * | 1/1985 | Satchell et al. .......... 280/86.75 |
| 4,595,216 A | 6/1986 | Ware | |
| 4,621,857 A | 11/1986 | Jagers | |
| 4,695,073 A | 9/1987 | Pettibone et al. | |

(Continued)

Primary Examiner—Paul N. Dickson
Assistant Examiner—Laura B. Rosenberg
(74) Attorney, Agent, or Firm—Calfee, Halter & Griswold, LLP (57) ABSTRACT

A sub-frame assembly for use with a vehicle having wheels such as a trailer is provided. The sub-frame assembly comprises two or more frame members, one or more cross members, and two or more stub torsion axle assemblies. Each of the stub torsion axle assemblies have a torsion arm, a spindle extending from the torsion arm for mounting one of the wheels, and a distal end extending from the stub torsion axle assembly for mounting to the frame assembly. The frame assembly may further comprise one or more shim plates for reception between the cross member and the distal end of the stub torsion axle assembly for allowing adjustment of the toe angle of the wheel assembly. In addition, the stub torsion axle assembly may be rotatably mounted to the cross member whereby the camber angle of the wheel assembly may be adjusted.

20 Claims, 7 Drawing Sheets

U.S. PATENT DOCUMENTS

| | | |
|---|---|---|
| 4,723,790 A | 2/1988 | Wharton |
| 4,736,964 A * | 4/1988 | Specktor .................. 280/86.75 |
| 4,838,573 A * | 6/1989 | Specktor et al. ......... 280/86.75 |
| 4,869,527 A * | 9/1989 | Coddens ................ 280/86.753 |
| RE33,179 E * | 3/1990 | Pettibone ............... 280/86.753 |
| 4,966,386 A | 10/1990 | Werdich |
| 4,973,075 A * | 11/1990 | Rori et al. ............. 280/86.757 |
| 5,031,928 A * | 7/1991 | Tsubota et al. ........ 280/86.756 |
| 5,158,321 A * | 10/1992 | Maul ................... 280/124.166 |
| 5,163,701 A | 11/1992 | Cromley, Jr. |
| 5,326,128 A | 7/1994 | Cromley, Jr. |
| 5,378,010 A * | 1/1995 | Marino et al. ........ 280/124.107 |
| 5,380,028 A | 1/1995 | Ferris et al. |
| 5,447,325 A | 9/1995 | DePue et al. |
| 5,899,470 A * | 5/1999 | Heitzmann ............. 280/86.751 |
| 6,340,165 B1 * | 1/2002 | Kelderman .......... 280/124.153 |
| 6,367,826 B1 * | 4/2002 | Klais ..................... 280/86.751 |
| 6,447,073 B1 | 9/2002 | Goettker |
| 6,851,687 B1 * | 2/2005 | Klais ..................... 280/86.754 |
| 6,923,452 B1 * | 8/2005 | Zachmeier et al. ...... 280/6.151 |
| 6,986,519 B1 * | 1/2006 | Smith ................. 280/124.128 |

* cited by examiner

TRAILER SUB-FRAME ASSEMBLY

PRIORITY CLAIM

This application claims the benefit under 35 U.S.C. § 119(e) of U.S. provisional application Ser. No. 60/474,649, filed on May 30, 2003, titled TRAILER SUB-ASSEMBLY, which is hereby incorporated by reference in its entirety.

FIELD OF THE INVENTION

The invention relates generally to towable trailers, and more particularly to the assembly and manufacture of a sub-frame assembly for a trailer.

BACKGROUND OF THE INVENTION

Prior art trailers such as those used in hauling portable equipment, livestock or recreational travel trailers typically use tandem axles. The axles are typically supplied to the trailer manufacturer from the axle manufacturer. The trailer manufacturer must then install and align both axles on the trailer as well as wire or plumb the brakes of each axle assembly to the trailer. Proper alignment of the axles on the trailer can be tedious and time-consuming. Further, once the axle has been installed it is very difficult to realign, and it is often necessary to replace the entire axle if one of the wheel ends has become misaligned or damaged.

Thus an improved axle sub-frame assembly for a trailer is desired which provides for independent alignment and realignment of each wheel, as well as easy installation of the axle sub-frame assembly by the trailer manufacturer.

DETAILED DESCRIPTION OF THE INVENTION

Figure 1:
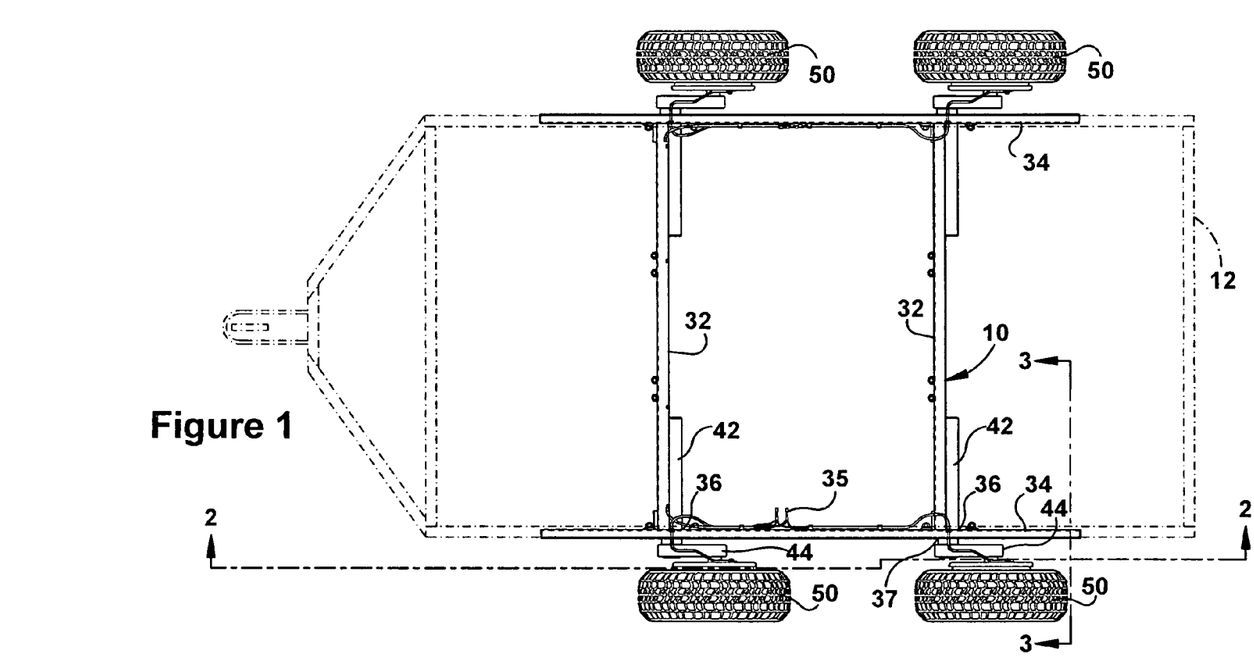
FIG. 1 is a top view of the trailer subassembly of the present invention.
Figure 2:
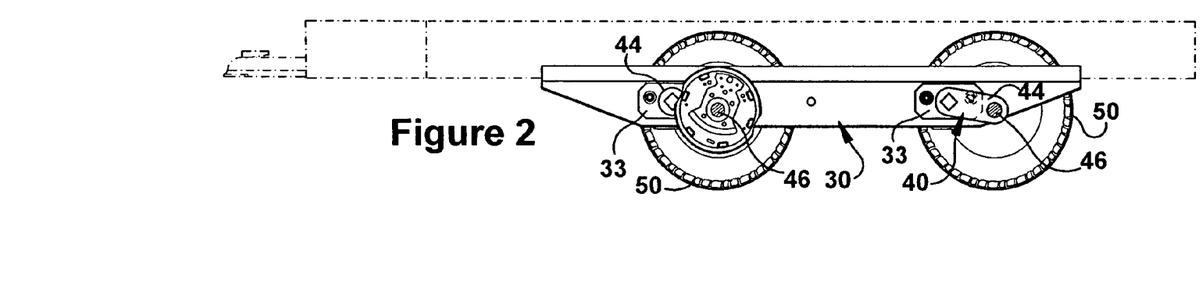
FIG. 2 is a cross-sectional side view in the direction 2—2 of the trailer sub-frame assembly shown in FIG. 1.
Figure 3:
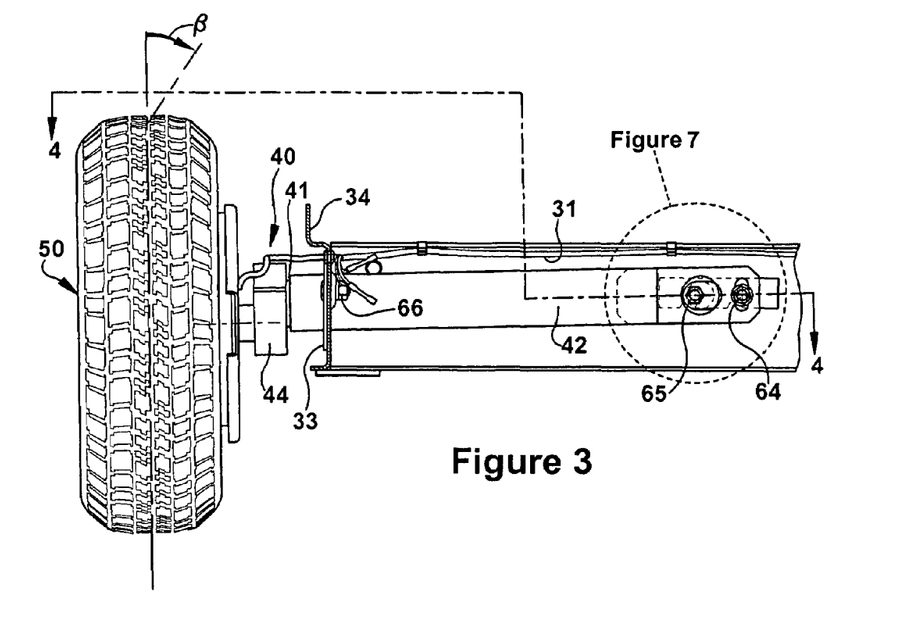
FIG. 3 is a cross-sectional side view in the direction 3—3 of the trailer sub-frame assembly shown in FIG. 1.

A first embodiment of a sub-frame assembly 10 of the present invention is shown in FIGS. 1–9. The sub-frame assembly 10 is suitable for use, for example, with a trailer in the 600 to 10,000 lb class, although the invention would work for any capacity trailer. For example, the invention may be used in conjunction with utility trailers, horse/livestock trailers and camper/recreational trailers. FIG. 1 illustrates the sub-frame assembly 10 shown mounted to a utility flat bed trailer 12 (shown in dotted lines). The sub-frame assembly 10 further includes a sub-frame 30 comprised of one or more cross-members 32 which join frame members 34 together. The cross members may be joined to frame members by weld, bolts or other means known by one skilled in the mechanical arts. Preferably, two cross-members 32 are utilized and each cross-member 32 is located at the desired axle location. The frame members 34 of the sub-frame 30 are connected to a conventional trailer 12 by conventional means such as by welding, bolts or other means apparent to those skilled in the mechanical arts.

One advantage of the subframe 30 of the invention is that the cross members 32 and the frame members 34 substantially support the axle loads in an efficient manner so that the trailer frame members may be reduced in cross-sectional size. Another advantage of the subframe 30 is that the subframe may be prewired/preplumbed so that the electrical/hydraulic brake lines 31 of each wheel assembly 50 are joined together in a central hookup location 35 such as shown in FIG. 1.

Figures 5, 6:
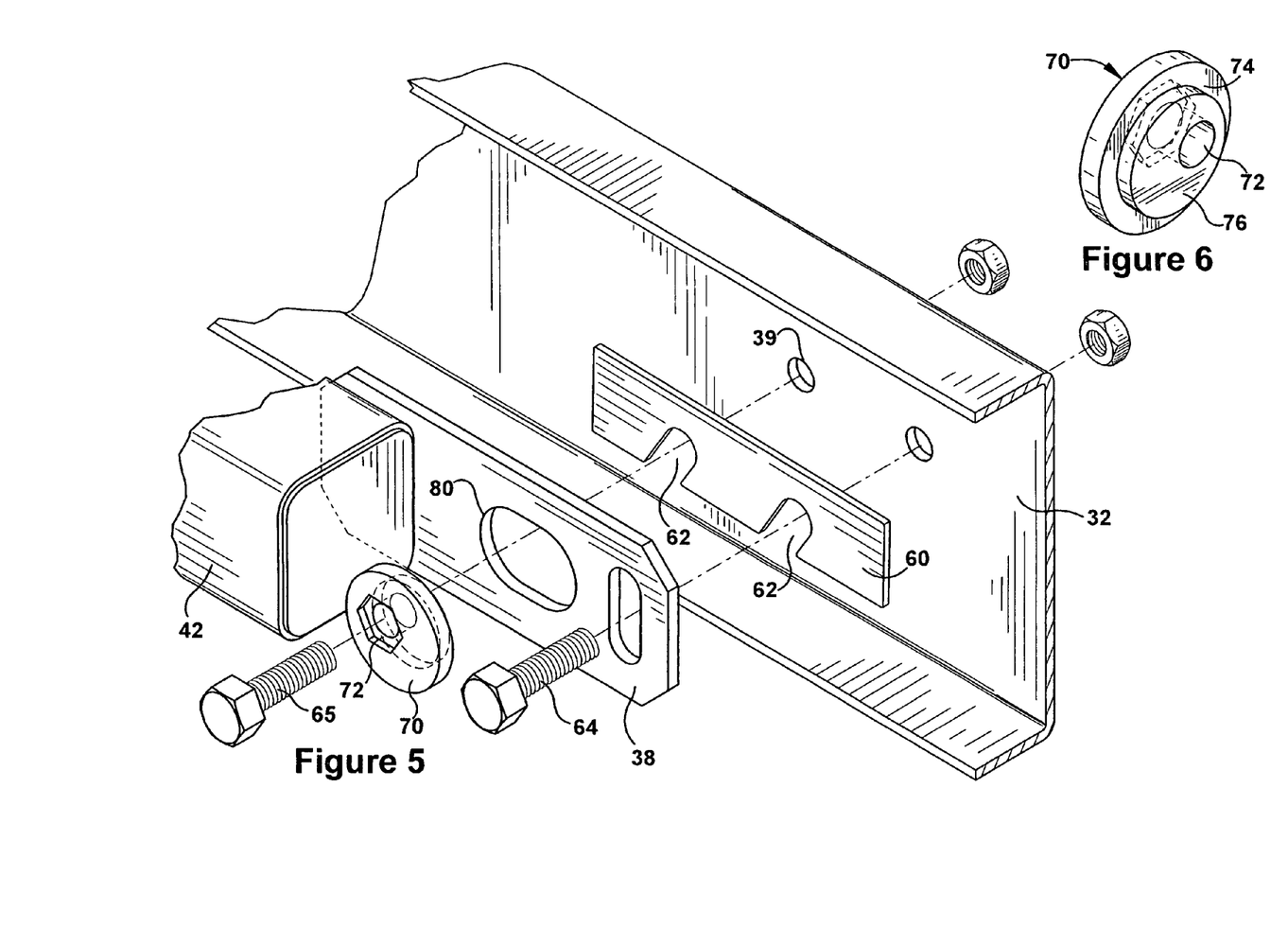
FIG. 5 is an exploded perspective view of the area denoted by the circled region of FIG. 3.
FIG. 6 is a perspective view of a cam member of the present invention.

A torsion axle stub assembly 40 is secured to the sub-assembly 10 at each of the desired wheel locations. Utilizing stub axles allows for independent adjustment of the camber and toe angles of each wheel assembly as described in more detail, below. A first end 42 of an axle stub assembly 40 is inserted through aligned hole 36 of frame member 34 and hole 37 of mounting bracket 33. Preferably, the mounting bracket 33 is welded to the stub axle prior to assembly to the sub-frame. The first end 42 of the axle subassembly is mounted to cross member 32 via cam bracket 38 as shown in FIG. 5. Pivotally connected to the first end of the axle is torsion arm 44. Extending from a front face of the torsion arm 44 is a spindle 46 for mounting a wheel and assembly 50, which preferably includes an electric or hydraulic brake (not shown). While other torsion axles can be used, the torsion axle is preferably one similar to a TORFLEX brand torsion axle from Dexter Axle, (Elkhart, Ind.) which utilizes a stub shaft 41 connected to the torsion arm 44 and which is surrounded by a plurality of rubber cylindrical members compressed between the shaft and the housing 42. As wheels which are mounted on hub 46 of torsion arm 44 encounter road irregularities, shock is absorbed by the rubber cylindrical members which resist rotation of the torsion arm 44.

Figure 4:
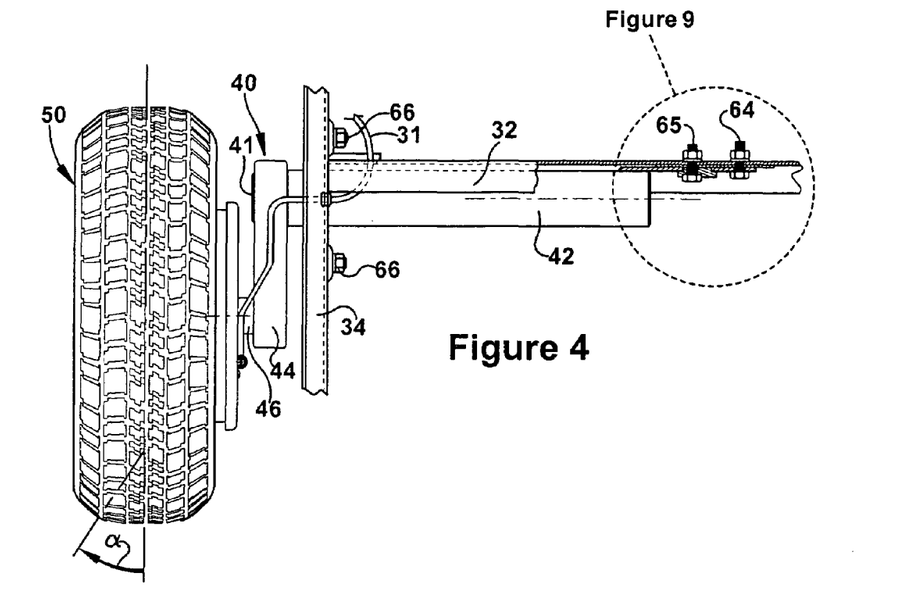
FIG. 4 is a cross-sectional top view in the direction 4—4 of the trailer sub-frame assembly shown in FIG. 3.
Figure 9:
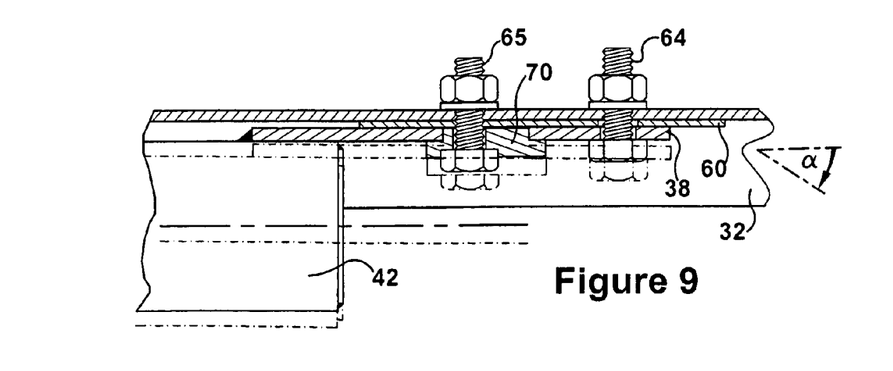
FIG. 9 is a close up view of the area denoted by the circled region of FIG. 4 and illustrating in bold the before adjustment of the toe angle and after the adjustment in dotted lines.
Figure 10:
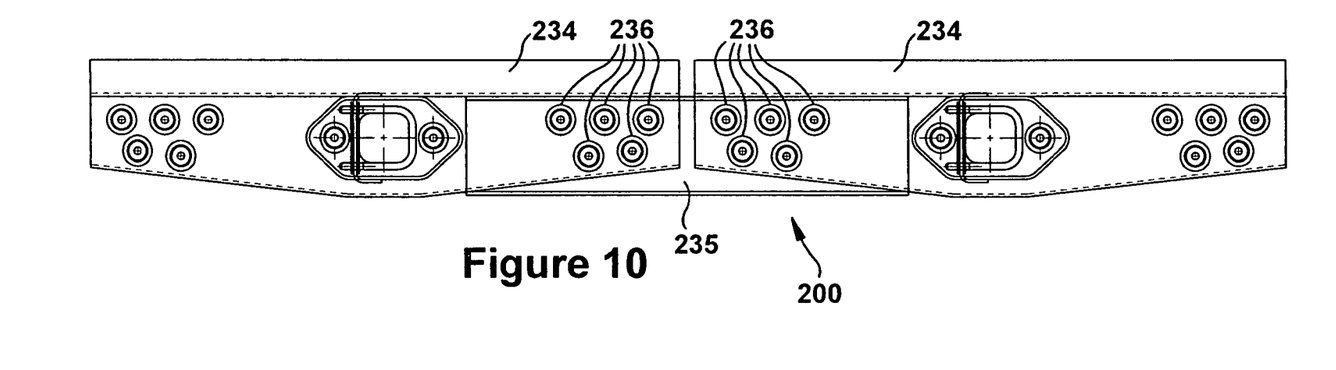
FIG. 10 is a side view of a selected portion of an exemplary sub-frame assembly.
Figure 11:
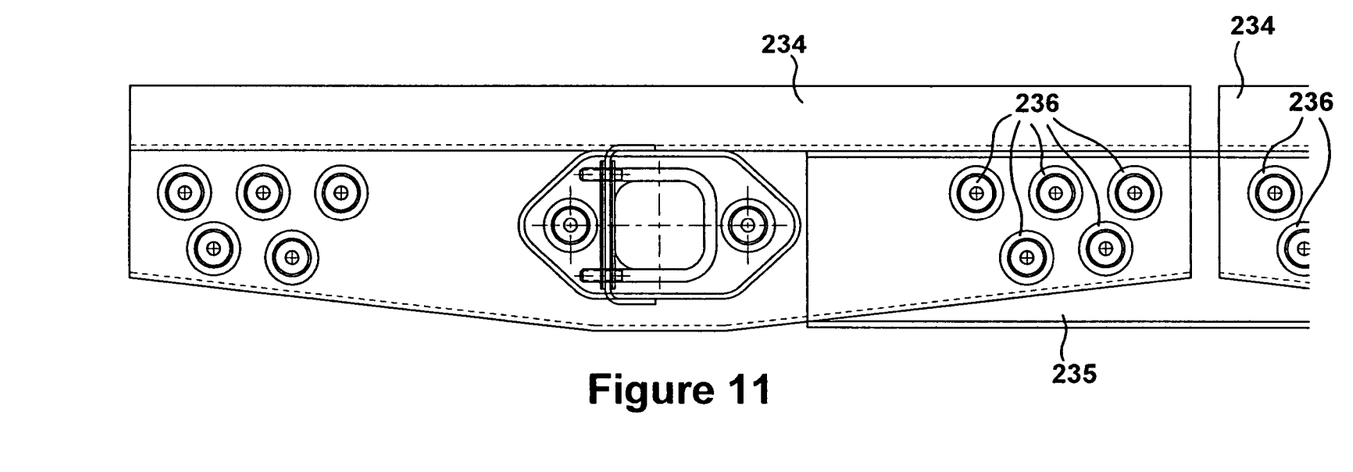
FIG. 11 is another side view of a selected portion of an exemplary sub-frame assembly.
Figure 12:
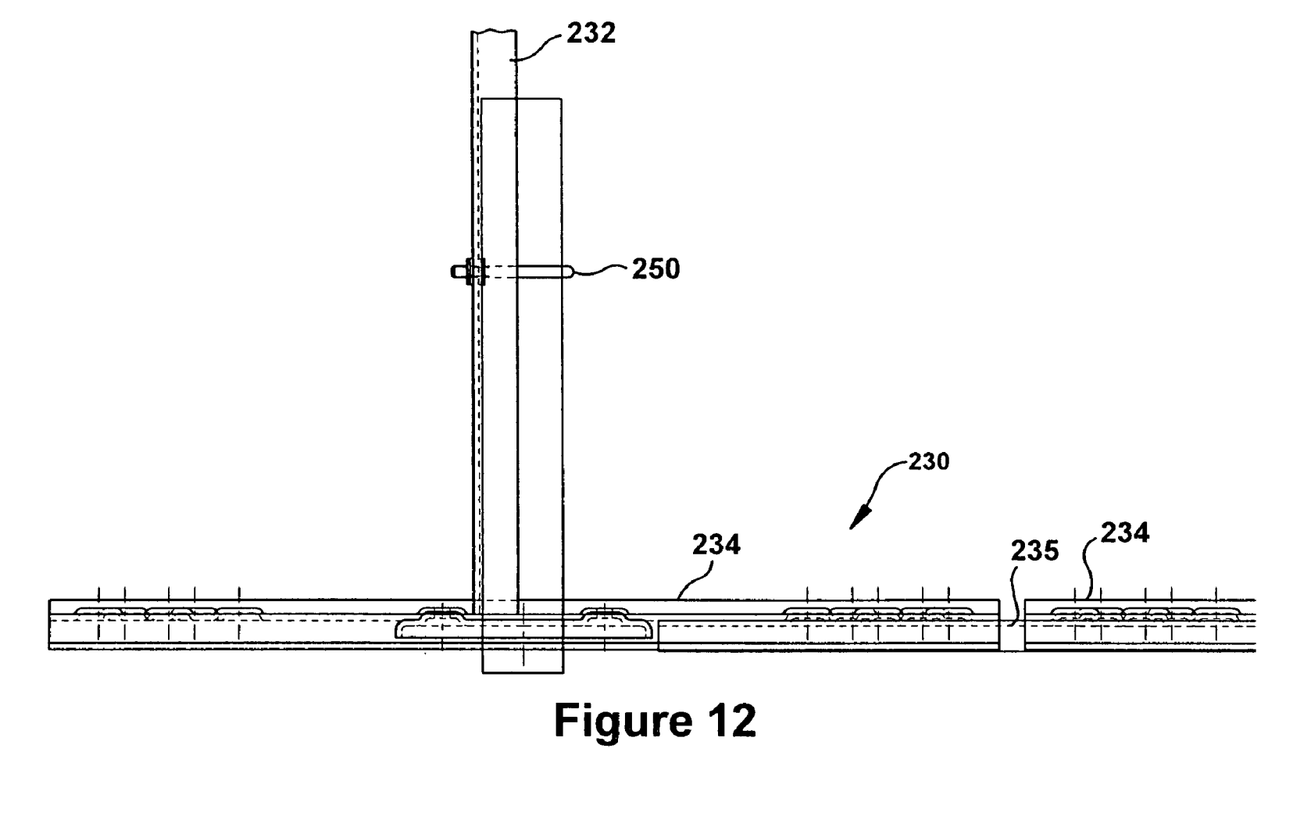
FIG. 12 is a top view of a selected portion of an exemplary sub-frame assembly.

Another aspect of the invention is the ability to independently adjust the toe angle of each wheel assembly. As best shown in FIGS. 4, 5 and 9, the toe angle α of each wheel assembly 50 may be adjusted as follows. One or more shim plates 60 may be inserted between the cross member 32 and the cam mounting bracket 38 after bolts 64,65 are loosened. The shim plate 60 has aligned holes or slots 62 for receiving mounting bolts 64,65. Slots 62 are preferably angled in order to facilitate installation. As partially shown in FIG. 9, as one or more shim plates are inserted between the cross member 32 and the cam mounting bracket 38 of the wheel assembly, the angle α changes so that the wheel "toes in". FIG. 9 illustrates the assembly in solid lines prior to addition of the shim plate 60 and the assembly in dotted lines after installation of the shim plate.

Figure 7:
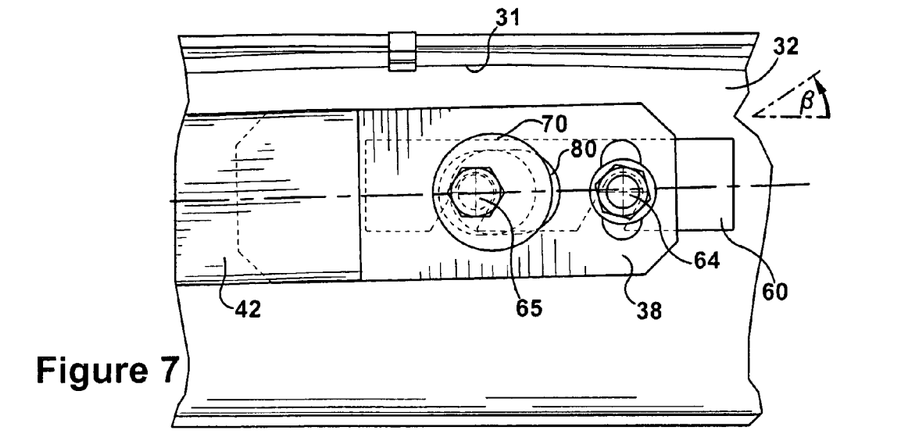
FIG. 7 is a front view of FIG. 5.
Figure 8:
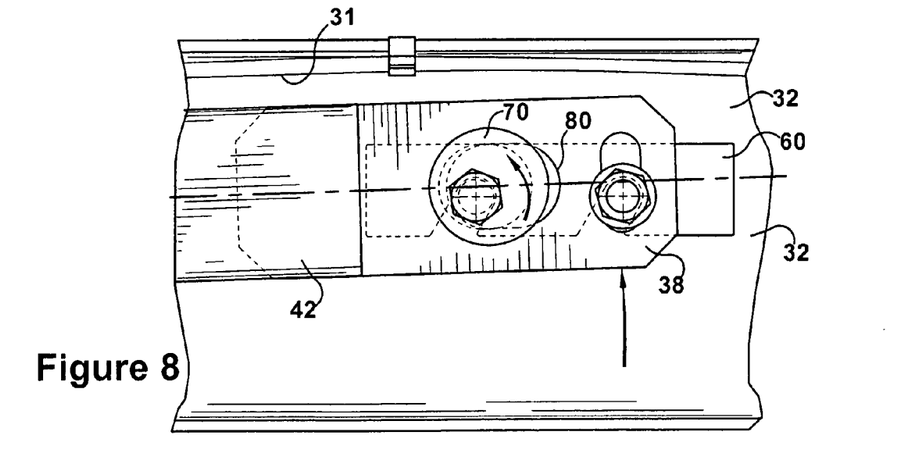
FIG. 8 is a front view of FIG. 5 shown after adjustment of the camber angle.

Another aspect of the invention is the ability to independently adjust each camber angle β for a given wheel assembly. Further, for each wheel assembly, the camber angle β can be adjusted independently of the toe angle α. As shown in FIGS. 6, 7 and 8, the camber angle β can be adjusted by first loosening bolts 64,65. The cam bolt 65 is received in offset hole 72 of cam member 70 and hole 39 of the cross-member 32. Cam member 70 has an exterior surface 74 from which projection 76 extends there from. Projection 76 is received in an elongated slot 80 of the cam mounting bracket 38 of the wheel assembly 50. Once bolts 64,65 have been loosened, the cam bolt 65 is moved or rotated in order to rotate the cam member 70. As the cam member 70 rotates, the position of the offset mounted cam bolt with respect to the cam bracket 38 changes, resulting in an increase/decrease of the camber angle β of the wheel assembly, respectively. This action occurs in part because the cam bolt is fixed in location relative to the cross member 32. After the camber and toe angles have each been adjusted to the their desired angle, the bolts 64,65 are tightened. The process is then repeated for each wheel assembly.

Figure 13:
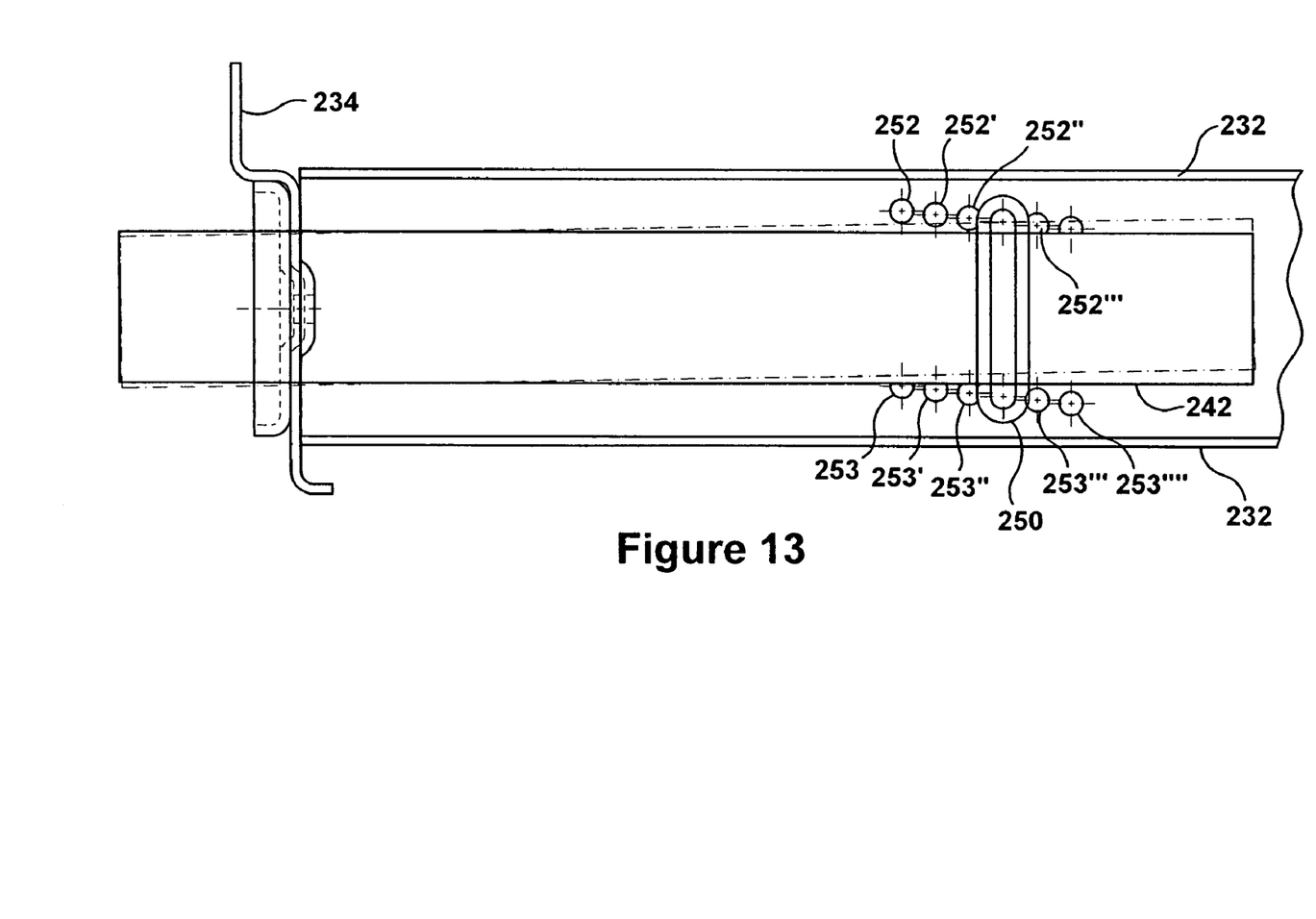
FIG. 13 is an elevational view of a portion of an exemplary sub-frame assembly.

FIGS. 10–13 illustrate another embodiment of a trailer sub-frame assembly 200 wherein the camber angle may be adjusted. The sub-frame assembly 200 comprises frame members 230 joined by cross members 232. The frame members 230 further comprise two outer members 234 joined by a spacer member 235 which are joined together via fasteners 236. The outer member 232 and the spacer members 235 are provided with a plurality of holes 237 to allow for the adjustment of the axle spacing. While not shown, the cross member 232 may be similarly configured to provide an adjustable width frame. FIG. 13 illustrates a close up side view of the cross-member 232 and the arm 242 of the stub axle assembly. The cross member 232 further comprises a first set of two or more indexing holes 252,252',252" spaced on closely spaced increments and wherein the centers of the holes are spaced along an angular incline. The cross member may further optionally comprise a second set of indexing holes 253,253',253" aligned with said first set of indexing holes for each lateral location. A securing member such as a bolt, preferably a U bolt mechanism 250 is received in said indexing holes and secures the arm 242 of the stub axle assembly to the cross-member 232. In order to adjust the camber angle, the securing member or U bolt 250 is inserted into the indexing hole(s), the camber angle is measured, and the process is repeated until the desired camber angle has been set.

It is important to note that the mechanical features described above that allow the angular adjustments of toe and camber could also be used on a conventional trailer. While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. A sub-frame assembly mountable to a frame of a trailer, the sub-frame assembly comprising:
   two or more frame members;
   one or more cross members;
   one or more stub torsion axle assemblies removably mounted to the sub-frame assembly, each of said stub torsion axle assemblies having a stub axle, a torsion arm attached to the stub axle, a spindle extending from said torsion arm for mounting a wheel assembly, and a first end for mounting to the trailer frame; and
   a cam member rotatably mounted to the first end of the stub torsion axle assembly;
   said cam member comprising an offset hole for receiving a connecting member therein for connecting the stub torsion axle assembly, the cam member and the cross member together; wherein rotation of the cam member results in a change in the camber angle of the wheel assembly.

2. The sub-frame assembly of claim 1 wherein the first end of the stub torsion axle assembly is mounted to the cross member whereby the camber angle of the wheel assembly may be adjusted.

3. The sub-frame assembly of claim 1 further comprising one or more shim plates between the cross member and the first end of the stub torsion axle assembly, the selected presence of which causes a change of the toe angle of a wheel of the wheel assembly.

4. The sub-frame assembly of claim 1, wherein each stub axle comprises:
   a. a housing; and
   b. a stub shaft within the housing and connected to the torsion arm,
   wherein the stub shaft is surrounded by a plurality of resilient members compressed between the shaft and the housing.

5. A trailer assembly comprising:
   a frame including two or more frame members and one or more cross members;
   two or more stub torsion axle assemblies, each of said stub torsion axle assemblies having a stub axle, a torsion arm attached to the stub axle, a spindle extending from said torsion arm for mounting a wheel, and a first end for mounting to the frame;
   a first member rotatably mounted to the stub torsion axle assembly; and
   a connecting member for connecting the stub torsion axle assembly to the cross member and the first member; wherein rotation of the first member results in a change in the camber angle of the wheel assembly.

6. The trailer assembly of claim 5 further comprising one or more shim plates between the cross member and the first end of the stub torsion axle assembly, the selected presence of which causes a change of the toe angle of the wheel.

7. The trailer assembly of claim 5 wherein the first end of said stub torsion axle assembly is mounted to the cross member whereby the camber angle of the wheel assembly may be adjusted.

8. The trailer assembly of claim 7 further comprising one or more shim plates between the cross member and the first end, the selected presence of which causes a change of the toe angle of the wheel.

9. The trailer assembly of claim 5 further comprising a sub-frame assembly, wherein said stub torsion axle assemblies are removably mounted to the sub-frame assembly, and wherein said sub-frame assembly is mounted to the trailer assembly.

10. The trailer assembly of claim 5, further comprising means for adjusting the camber angle of the wheel.

11. The trailer assembly of claim 10 further comprising means for adjusting the toe angle of the wheel.

12. The trailer assembly of claim 5, wherein each stub axle comprises:
   a. a housing; and
   b. a stub shaft within the housing and connected to the torsion arm,
   wherein the stub shaft is surrounded by a plurality of resilient members compressed between the shaft and the housing.

13. The trailer assembly of claim 5 wherein said first end of the stub torsion axle assembly comprises a slot and said first member further comprises a projection received in said slot; wherein rotation of the first member causes engagement of the projection in the slot with the first end of the stub torsion axle assembly, causing the change in the camber angle of the wheel assembly.

14. A trailer assembly comprising:
   a frame including two or more frame members and one or more cross members:
   two or more stub torsion axle assemblies, each of said stub torsion axle assemblies having a stub axle, a torsion arm attached to the stub axle, a spindle extending from said torsion arm for mounting a wheel, and a first end for mounting to the frame; and
   a cam member rotatably mounted to the first end of the stub torsion axle assembly;
   said cam member comprising an offset hole for receiving a connecting member therein for connecting the first end of the stub torsion axle assembly, the cam member and the cross member together; wherein rotation of the cam member results in a change in the camber angle of the wheel assembly.

15. The trailer assembly of claim 14 wherein said first end of the stub torsion axle assembly comprises a slot and said cam member further comprises a projection received in said slot; wherein rotation of the cam member causes engagement of the projection in the slot with the first end of the stub torsion axle assembly, causing the change in the camber angle of the wheel assembly.

16. The trailer assembly of claim 14 further comprising a sub-frame assembly, wherein said stub torsion axle assemblies are removably mounted to the sub-frame assembly, and wherein said sub-frame assembly is mounted to the trailer assembly.

17. The trailer assembly of claim 14, further comprising means for adjusting the camber angle of the wheel.

18. The trailer assembly of claim 17 further comprising means for adjusting the toe angle of the wheel.

19. The trailer assembly of claim 14, wherein each stub axle comprises:
   a. a housing; and
   b. a stub shaft within the housing and connected to the torsion arm,
   wherein the stub shaft is surrounded by a plurality of resilient members compressed between the shaft and the housing.

20. A trailer assembly comprising:
   a. at least two parallel frame members;
   b. at least one cross member extending between the parallel frame members; and
   c. at least two axle assemblies capable of having a wheel mounted thereon and attached to the cross member by a bracket, each axle assembly comprising:
      i. an arm;
      ii. a spindle extending from the arm capable of supporting a wheel assembly;
      iii. a housing; and
      iv. a stub shaft within the housing and connected to the arm;
   wherein the stub shaft is surrounded by a plurality of resilient members compressed between the shaft and the housing and further wherein the toe angle of the wheel is adjustable by insertion of a selected number of shim plates between the bracket and the cross member.

* * * * *